May 29, 1973     F. CILIBERTI     3,736,189

LOCKING DEVICE FOR BATTERY STICKS

Filed Feb. 29, 1972

United States Patent Office 3,736,189
Patented May 29, 1973

3,736,189
LOCKING DEVICE FOR BATTERY STICKS
Frank Ciliberti, Ossining, N.Y., assignor to
P. R. Mallory & Co., Inc., Indianapolis, Ind.
Filed Feb. 29, 1972, Ser. No. 230,324
Int. Cl. H01m 1/02
U.S. Cl. 136—132                                    4 Claims

ABSTRACT OF THE DISCLOSURE

This invention relates to means and methods for preventing the formation of corrosion between the outer metal can of a battery and its circumscribing insulative jacket or sleeve. A cantilever type of metal tab is affixed to usually the central portion of the battery. The tab, having a gouging finger edge portion, allows the insulative jacket to slip over the can, but the finger portion will dig into the internal surface of the jacket making it extremely difficult for the jacket to be withdrawn once it is placed over the tab. The insulative jacket, or sleeve has a crimped end and an open end, with the crimped end abutting a disc terminal of the battery so as to preclude any further downward travel on the metal can.

---

This invention relates to a novel and improved containing and locking device for a plurality of electrochemical cells or battery assemblies. It comprises a cantilever type of restraining tab affixed to an outside can of the assembly. The tab, which has a gouging, cantilevered edge portion, allows an insulative jacket for the battery assembly to override the same. The top gouging portion acts to dig into the internal surface of the circumscribing insulative sleeve making it extremely difficult to withdraw the sleeve once it is placed over the tab.

A problem confronting the fabrication and assembling of individual cells and/or batteries, has been the need to devise a satisfactory means for placing a circumscribing insulating jacket about the outer can thereof. Until now, the standard technique was to incorporate a spiral winding containing a water-activated glue into the insulative jacket, and thus to restrain the sleeve thereon.

However, this was found to be unsatisfactory for a number of reasons. Primarily, when the water comes in contact with the battery can, rusting develops which eventually leaks to the outside of the jacket. Other disadvantages include the increased labor and costs involved in incorporating the special glue winding into the battery jacket.

The primary object of the present invention, therefore, is to provide greatly improved means for placing an insulative, circumscribing sleeve around the outer can be a primary battery.

It is a further object of the present invention to obviate the formation of corrosion between the usual outside metallic conductive surface of a battry and its circumscribing, insulative jacket.

Another object is to eliminate the need for a special glue winding incorporated into the battery jacket to retain the same on the outside can thereof.

It is a further object of the present invention to provide an improved insulating jacket-containing device which maintains said circumscribing insulative jacket on a battery can in a greatly improved manner.

Generally speaking, this invention provides means and methods for preventing the formation of corrosion between the outer metal can of a battery assembly and its circumscribing insulative jacket or sleeve. A cantilevered metallic tab is affixed to usually the central portion of the battery can, as by means of a weldment. The tab has a gouging finger edge portion. The insulative sleeve has a crimped end and an open end; with the crimped end abutting a disc terminal of the battery so as to preclude any further downward travel on the metal can. The resiliently mounted cantilever spring or tab allows the plastic or cardboard insulative jacket to override the same, but its gouging free finger portion digs into the internal surface of the sleeve making it extremely difficult to withdraw the jacket once it is placed over the tab. In this manner, the heretofore usual means of incorporating a special winding into the insulative tube is obviated, with the consequent improvement in the battery by preventing corrosion and in effectuating a reduced cost while providing a greatly improved locking or containing means for the jacket on the battery.

Figure 1:
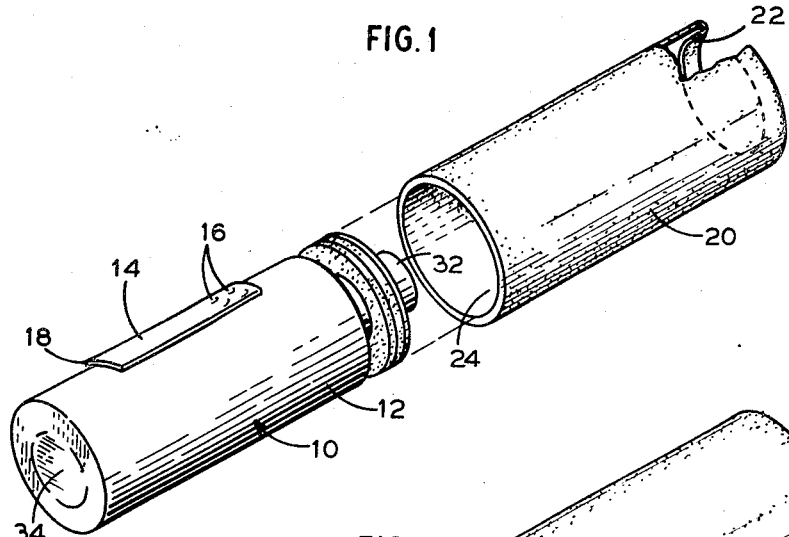
FIG. 1 is a perspective exploded view of a battery assembly showing the relationship of an insulative jacket to its associated battery, and wherein a resiliently mounted cantilever spring or tab is mounted on the metal can of the battery whereby the jacket is affixedly placed thereupon without glue or other paste means.

As generally shown in FIG. 1, a battery 10, constructed in accordance with this invention, comprises a metal casing 12, to which tab 14 is affixed, and a plastic or cardboard insulative jacket or tube 20, which may have identifying indicia thereon. The cantilevered metallic tab 14 is affixed to usually the central portion of the battery casing 12 by suitable means such as spot welds 16. The tab 14 has a gouging finger edge portion 18 which may be toothed, roughened or burred. The insulative sleeve 20 has a crimped end 22 and an open end 24, with the crimped end 22 abutting a terminal of the battery, herein the negative electrode 32.

Figure 2:
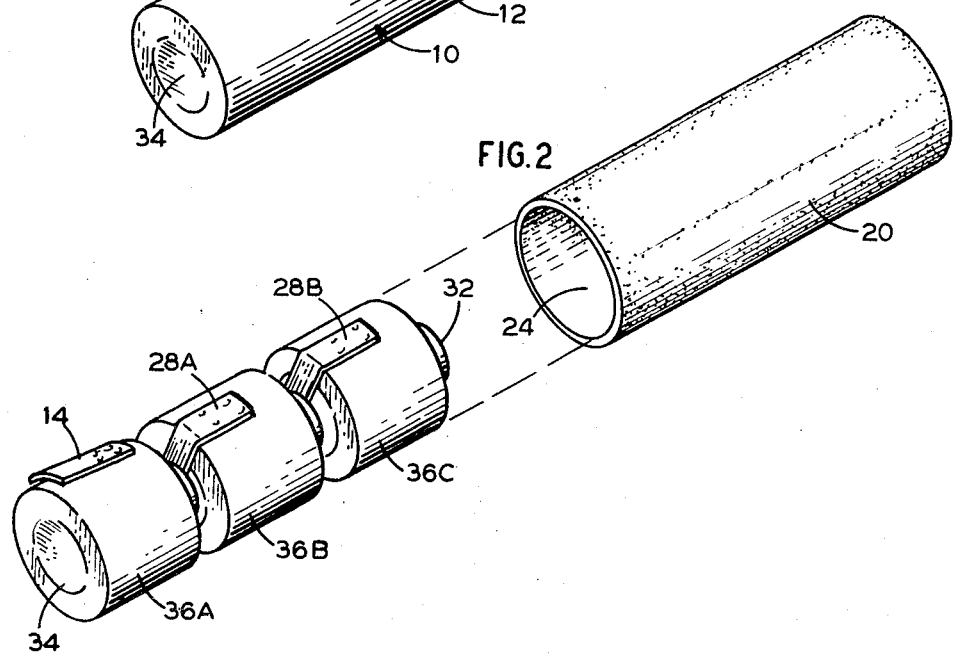
FIG. 2 is a perspective view of a battery assembly comprising three individual cells where the tab is affixed to the cell adjacent to the open end of the insulative tube.

The manner in which the tab secures the insulative sleeve to a multi-cell battery is shown in FIG. 2.

As shown in FIG. 2, the insulative sleeve 20 simply overrides the individual cells 36A, 36B, and 36C having intercell connectors 28A and 28B therebetween. Tab 14 gougingly engages the inner surface of insulative jacket 20 to prevent the jacket 20 from being withdrawn once it is placed over the tab.

Figure 3:
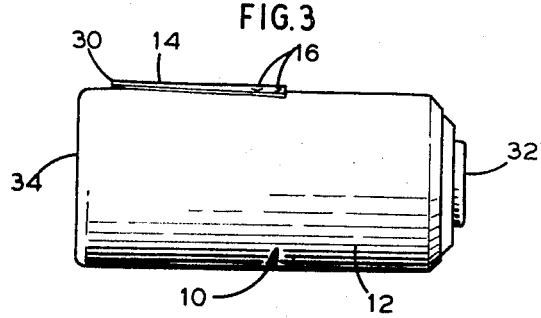
FIG. 3 is a side view of the battery casing of FIG. 1 with the affixed tab.

FIG. 3 is a side view of a single battery having tab 14 affixed thereto which shows more clearly the details of tab 14.

As illustrated in FIG. 3, a single battery 10, comprising metal casing 12, negative electrode 32, and positive electrode 34 has tab 14 affixed, by suitable means such as spotwelds 16, to the central portion of said casing. The finger edge portion of tab 14 is made into a gouging edge 30 by suitable means. End 30 may be toothed, roughened or burred to enable it to act as a detent so as to prevent the insulative tube from backing off.

Therefore, a feature herein is the provision of a tab which acts as a detent mechanism by having one end that digs into the inner surface of the insulative sleeve circumscribing a battery assembly, and another end affixed to the outer metal can of the battery. Thus, this novel locking device obviates the need for a special glue winding to be incorporated into the battery jacket.

By the construction and arrangement of the elements disclosed herein, several difficult problems encountered in manufacturing batteries are solved in a commercially feasible manner. It will be clear that modifications and changes may be made within the spirit of the invention without departing from the spirit and scope of the claims.

What is claimed is:

1. Locking means for maintaining a circumscribing jacket of insulated material on a battery, said battery comprising an outside metallic can acting as an electrode therefor, tab means mounted on said can, said tab having a free finger portion joined to said can at the opposite end of said finger; an insulated jacket adapted to be fitted over said metal can of said battery, said jacket being restrained by said finger portion of said tab so as to preclude the jacket from slipping off the can once said jacket has been placed thereover.

2. The locking means in claim 1 wherein said tab means is resiliently mounted on said can, said tab having a portion joined to said can at the oposite end of said finger.

3. The locking means in claim 2 comprising a metal tab having a gouging free finger portion.

4. The locking means in claim 1 wherein said insulated jacket has a crimped end and an open end adapted to be fitted over said metal can of said battery, and has identifying indicia thereon.

References Cited

UNITED STATES PATENTS

| | | | |
|---|---|---|---|
| 1,277,042 | 8/1918 | Burgess | 136—110 |
| 1,307,868 | 6/1919 | Lyhne | 136—132 |
| 1,374,168 | 4/1921 | Recker | 136—110 |
| 2,864,880 | 12/1958 | Kaye | 136—111 |
| 3,676,221 | 7/1972 | Bach | 136—107 |

DONALD L. WALTON, Primary Examiner

U.S. Cl. X.R.

136—181